Feb. 21, 1939.   L. W. SCOTT, JR   2,148,281
INSULATING STRUCTURE
Filed Oct. 22, 1937
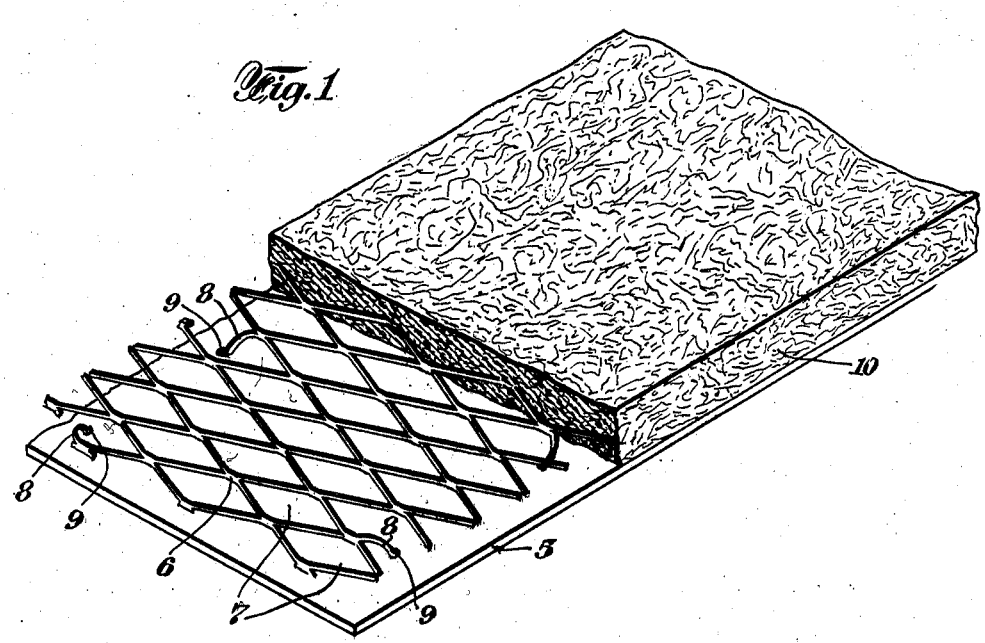
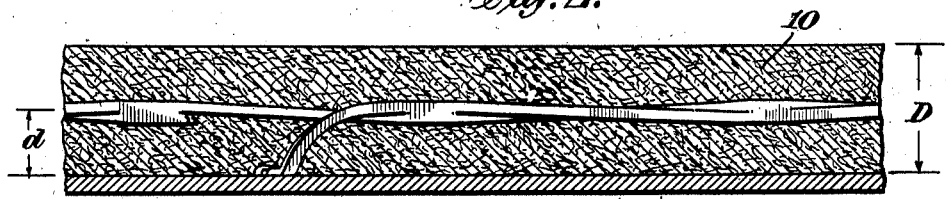
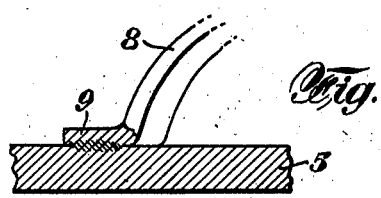
INVENTOR
Louis W. Scott, Jr.
BY
Edwards, Bower & Pool
ATTORNEYS Patented Feb. 21, 1939

2,148,281

UNITED STATES PATENT OFFICE 2,148,281

INSULATING STRUCTURE

Louis Wilson Scott, Jr., Roxboro, Pa., assignor to The Bird-Archer Co., Philadelphia, Pa., a corporation of New Jersey Application October 22, 1937, Serial No. 170,405

2 Claims. (Cl. 72—16)

This invention relates to heat insulation and particularly to insulation for the steel walls of bulkheads and the like in ships.

The object of the invention is to provide insulation which will give effective protection against heat and cold and which will be structurally strong and durable so as to form a permanent lining for the wall to which it is applied.

Further objects of the invention, particularly in the method of application of the insulation, will appear from the following description taken in connection with the accompanying drawing in which:

Fig. 1 is a perspective fragmentary view of the insulation as applied to a wall.

Fig. 2 is a sectional view on the line 2—2 of Fig. 1, and

Fig. 3 is a perspective view on a large scale illustrating one method of attaching the insulating structure to the wall.

The steel walls and bulkheads of ships are exposed to extremes of high and low temperature and often to sudden temperature changes. They are also subjected to severe stress and vibrations tending to loosen and detach any adhering surfacing. To meet these conditions the insulation of this invention combines good insulating properties and structural strength with sufficient thickness or body to maintain the temperature differences required and the structure as a unit is strongly attached to the wall.

To attain this the wall 5 (Fig. 1) is first provided with sheet 6 of expanded or perforated metal having relatively large openings 7 and spaced from the wall a distance $d$ about one-third or two-thirds of the depth $D$ of the insulation. The spacing means for the sheet 6 may be provided in any desired form but with expanded metal of the type shown I prefer to use inwardly bent portions of the sheet for the spacing means. As illustrated in Fig. 3 parts such as 8 of the sheet may be bent inward and provided with a protruding foot portion 9 adapted to be spot welded or otherwise fastened to the surface of the wall.

This sheet 6 provides a reinforcing attachment and support for the insulation 10 which is subsequently applied through the interstices of the sheet and over the sheet to have a smooth or other decorative surface finish.

The insulation 10 is basically formed of fibres of slag wool combined with a clayey ingredient and a hydraulic setting cement such as Portland cement. These materials are mixed dry with about 4% of asbestos fibres, the blown slag fibres being in proportion of 60 to 80% with clay, preferably white, 10 to 20% and Portland cement 10 to 25%. This composition after mixture is wetted and applied as a mortar to the face of the expanded metal mesh 6 so that it is forced through the mesh to the plate. In the example shown the expanded metal lath has one and one-half inch mesh No. 16 gage and is spaced one-half inch from the surface of the wall 5, the total thickness D of the insulation being approximately one inch. The outside surface of the insulating composition is troweled smooth and left to set, the setting being substantially completed within a few hours after which the insulation is permitted to dry and harden.

This insulating material has high heat resistance and low conductivity and ample strength to stand normal shock and vibration and presents a surface to which paints and lacquers will firmly and smoothly adhere. As an example of the material, a dry mixture of 4% asbestos fibres, 16% white clay, 60% blown slag wool and 20% Portland cement has given very satisfactory results.

When applied and dry it is low in weight per cubic foot. Three and one half pounds will cover one square foot of surface 1" thick. As mixed with cold water to the consistency of ordinary wall plaster (ten gallons to fifty pounds) it may be applied with ease. An application of 1" thickness requires only one coat, presenting a fine texture finish, is glossy in appearance and is semi-waterproof. A dry surface will take paint of either oil or water base sprayed or brushed.

The insulating structure of this invention may be applied to walls or ceilings and will give a permanent insulating finish. It is obvious that various spacings of the supporting reinforcing sheet may be resorted to in combination with various thicknesses of the applied insulating material depending upon the amount of insulation required.

The slag wool fibres are formed by melting vitreous slag material and blowing and solidifying it in shreds to give a most desirable form of blown mineral fibres, but other types of blown mineral fibres may be used. The clay (hydrous silicate of alumina) is preferably evenly distributed through the body of the insulation but may be relatively concentrated in the inner portions where harder surface effects are desired. Similarly the Portland cement may be relatively concentrated up to 30%, for instance, in the surface layer and kept at much lower values in the inner portions of the insulation.

The composition is readily varied to give the desired surface and is simple to apply and effective and durable in use. It will not flake or crack off and can be repeatedly surfaced and resurfaced without detracting from its insulating properties.

I claim:

1. An insulating structure comprising in combination a metal sheet or plate forming a wall or ceiling, an openwork sheet or plate of metal substantially parallel to the wall or the ceiling and rigidly supported therefrom in predetermined spaced relation and having openings sufficiently large to provide for the supply of a plastic composition through said openings into said space between said sheets or plates and to permit an outer layer of said composition to be bonded to the inner layer through said openings, and a solid body of insulation completely covering and embedding the meshes of said openwork sheet or plate and continuous through the openings thereof and having its inner surface in face to face contact with said wall or ceiling and its outer surface freely exposed on the opposite side of said openwork sheet or plate and spaced outward therefrom.

2. An insulating structure as set forth in claim 1 in which the insulation embodies a mixture of a setting cement and a filler of insulating particles.

LOUIS WILSON SCOTT, Jr.